June 25, 1929.  H. E. DIETRICH  1,718,896
METHOD AND APPARATUS FOR PREPARING LINK SAUSAGES
Filed Dec. 20, 1926   2 Sheets-Sheet 1
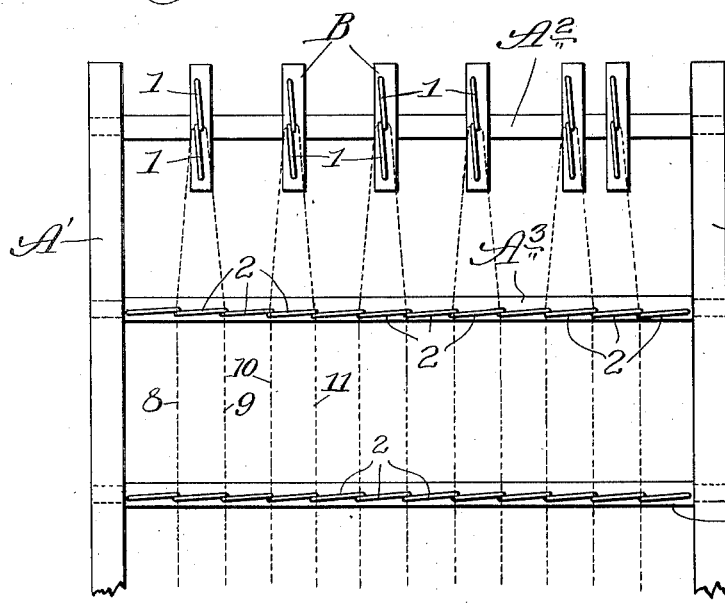
Fig.1.
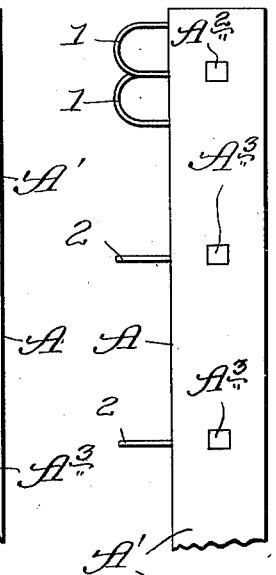
Fig.2.
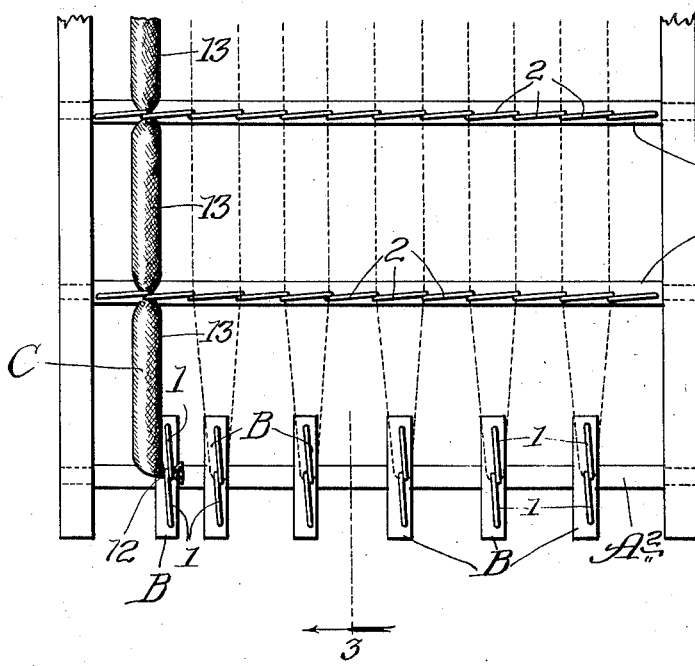
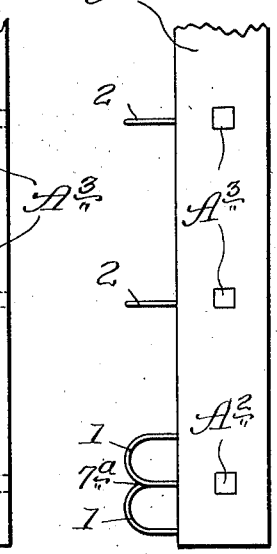
Inventor:
Harold E. Dietrich,
By Dyrenforth, Lee, Chritton & Niles,
Attys.

June 25, 1929.  H. E. DIETRICH  1,718,896
METHOD AND APPARATUS FOR PREPARING LINK SAUSAGES
Filed Dec. 20, 1926  2 Sheets-Sheet 2
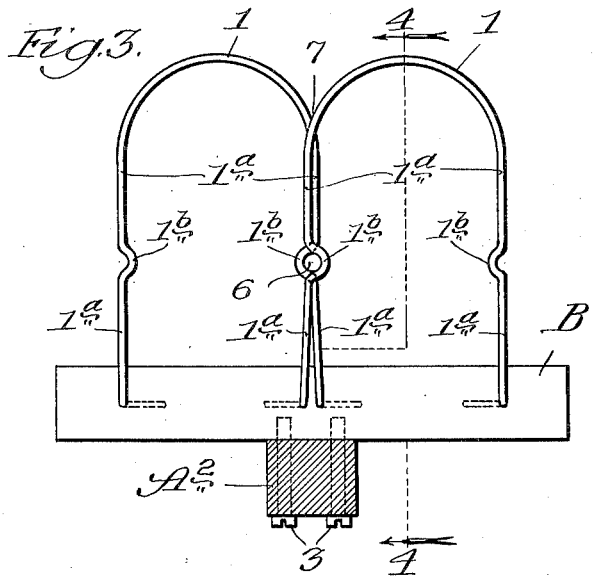
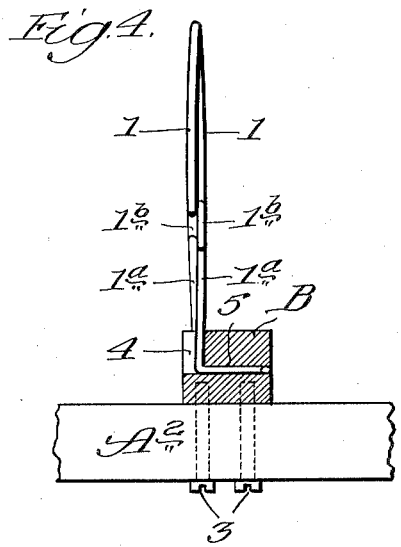
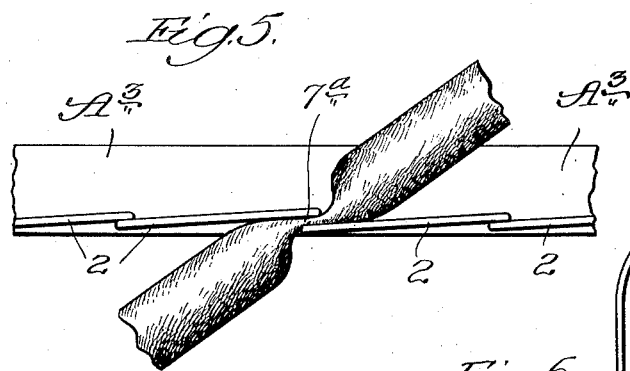
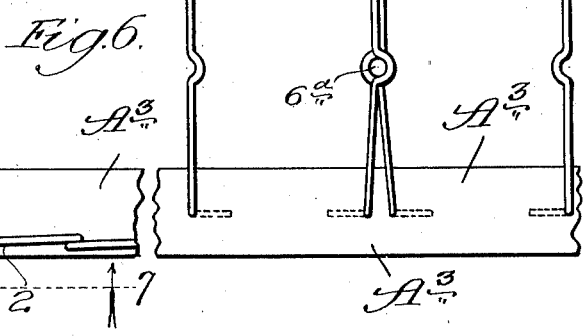
Inventor:
Harold E. Dietrich,
By Dyrenforth, Lee, Chritton & Wiles,
Attys.

Patented June 25, 1929.

1,718,896

UNITED STATES PATENT OFFICE.

HAROLD E. DIETRICH, OF CHICAGO, ILLINOIS, ASSIGNOR TO THE VISKING CORPORATION, OF CHICAGO, ILLINOIS, A CORPORATION OF VIRGINIA.

METHOD AND APPARATUS FOR PREPARING LINK SAUSAGES.

Application filed December 20, 1926. Serial No. 155,963.

The present invention relates particularly to a method and apparatus for readily enabling stuffed sausages to be formed into links and cured, as by smoking and subsequent cooking.

It is common practice, in linking sausages, for the operator to pinch the filled sausage casing with the thumb and forefinger and thus squeeze back the meat, and then rotate the first link to cause a twisting of the casing at the constricted point. The operator moves his hands along the stuffed casing, effecting the linking in the manner suggested. After the entire length of sausage has been linked in this manner, it is carefully picked up from the table and placed upon the smoke-sticks, or supports, upon which the sausages hang during the smoking operation.

The method just described has several disadvantages; first, the labor involved in this method is excessive and the operation is rather slow and tedious; second, carelessness on the part of the operator in handling the linked casing frequently results in untwisting, thus necessitating retwisting after the linked sausage has been hung on the supporting pole; third, the links produced by the method described are of unequal length, and this cannot be fully overcome by employing a measuring block. The use of a measuring block slows up the operation, and does not result in uniformity.

The present invention provides for the production of links of uniform length in a facile manner, and greatly reduces the time and expense of linking and curing sausages.

The invention is applicable to sausages having either natural casings, or to sausages having artificial casings, such as cellulose casings. Also, it is applicable to all kinds of sausages, regardless of the kind of "meat" employed as a filling. Ordinary pork sausages, whether in natural or artificial casings, are amenable to the improved treatment; also sausages usually known as wieners and ordinarily prepared principally from beef meat may be treated by the improved method.

It is preferred to employ an artificial casing. Such a casing well adapted to the present purpose is described in Henderson and Dietrich Patent No. 1,612,508, granted December 28, 1926, such casing being formed by extruding viscose into tubular form and coagulating the viscose; purifying the casing; introducing into the casing a small percentage of a hygroscopic agent, such as glycerine, and drying the casing. The casing may be gathered onto a horn of a sausage machine and filled in the same manner as natural casings.

The accompanying drawings illustrate novel apparatus adapted to the practice of the improved process.

In the drawings—

Fig. 1 is a broken plan view illustrating apparatus adapted to the purpose of linking sausages and supporting the same during the subsequent curing operation, which may include smoking and cooking; Fig. 2 is a side elevational view of the device shown in Fig. 1; Fig. 3 is an enlarged sectional view taken as indicated at line 3 of Fig. 1; Fig. 4 is a sectional view taken as indicated at line 4—4 of Fig. 3; Fig. 5 is a broken plan view of one of the pincer-supporting bars equipped with pinching devices, the view illustrating the manner in which the sausage is entered between a pair of pinching devices; Fig. 6 is a similar view showing the sausage restored to longitudinal position after such insertion; and Fig. 7 is a broken elevational view taken as indicated at line 7 of Fig. 6.

In the illustration given, the apparatus comprises a sausage-stringing frame A composed of side-bars A', end bars A², and intermediate crossbars A³; a series of short longitudinal bars, or blocks, B supported on each end cross-bar A², each block being equipped with a pair of resilient wire arches 1 adapted to serve as pinching devices; and a series of wire arches 2 mounted on each intermediate transverse bar A³ and adapted to serve as pinching devices.

The sausage-stringing frame A preferably is constructed of light, non-corrodible metal, such as aluminum, or a suitable alloy; and the pinching devices 1 and 2 also are preferably constructed of noncorrodible metal, or of a metal coated with non-corrodible material.

The longitudinally disposed short bars, or blocks, B are secured to the end cross-members A² of the sausage-stringing frame in any suitable manner, as, for example, by screws 3 (Fig. 3). The wire arches 1 have their side members, or arms, 1ª provided with inwardly struck half-hoops 1ᵇ. The lower end-portions of the arms, or standards, 1ª are received in vertical grooves 4, with which the blocks B are provided, and the lower extremities of the standards are bent at right angles and extend through horizontal perforations 5 with which the blocks are provided, the extreme end-portions being bent or clinched so that the arches are firmly secured to the bars B. As thus described, the arches 1 are disposed in substantially longitudinal planes, with adjacent side members overlapping in such manner that the half-hoops 1ᵇ are in position to co-act with each other and are complemental with respect to each other, thus forming a restricted opening, or hole, 6. At their upper portions, the arches provide an entrance angle 7 through which the sausage casing may be entered when it is to be forced down between the arches. In the operation just referred to, a constriction in the sausage casing is formed, the sausage meat being pressed away from the constriction in each direction and the entry is effected in a manner similar to that shown in Fig. 5, the arms of the arches causing the constriction as the filled sausage casing is pressed downwardly. Thus, the walls of the sausage casing are forced together and the casing ultimately is held in the restricted opening 6.

The arches 2 with which the intermediate cross members A³ are equipped are similar to the arches 1, and are secured to the intermediate cross members in the same manner that the arches 1 are secured to the blocks B.

The adjacent side portions of the arches 2 overlap each other and form openings, or holes, 6ª which are accessible through entrance angles at 7ª in the same manner as has been described with reference to Fig. 3. It will be understood that the holes 6ª are in longitudinal alinement, or rather there is a series of longitudinal lines of holes along the lines 8, 9, 10, 11, etc., as shown in Fig. 1. These lines indicate the position of the sausage when strung upon the apparatus. The blocks B are located at intermediate positions between the lines 8 and 9, the lines 10 and 11, etc.

In stringing a sausage C on the sausage-stringing frame, the end-portion is pinched between a pair of pinching devices, or grippers, 1, as indicated at 12. The sausage is then pressed down between successive pairs of grippers in the manner illustrated in Fig. 5 and then straightened or brought to a longitudinal position in the manner indicated in Fig. 6. The stringing continues across the frame longitudinally in the manner indicated in Fig. 1, the sausage is then bent laterally and entered between a pair of grippers 1 at the remote end of the frame, and the longitudinal stringing of the sausage continues in the return direction along the line 9. The stringing of the sausage upon the frame is continued in an obvious manner until the frame is filled, or until the end of the sausage is reached. Thus, the grippers at the ends of the frame serve to hold the loop-portions of the sausage.

It is obvious from the description given that the constriction of the sausage casing is ordinarily effected by the gripping devices when the filled casing is pressed downwardly between the gripping devices. The gripping devices are uniformly spaced and serve to produce links 13 in the sausage which are of uniform length. After the sausage has been strung upon the gripper-equipped frame, the loaded frame is placed in the smoke house, where the sausage is subjected to the usual smoking operation. After this step in the curing of the sausage has been effected, the loaded frame is removed from the smoke house and the sausage is subjected to a cooking operation, if desired. Ordinarily, this is accomplished by placing the loaded frame in water which is at or near the boiling point; or, it may be accomplished by placing the loaded frame in a suitable chamber and admitting wet steam. In this manner, the sausage may be thoroughly sterilized and cooked to the desired degree of tenderness.

Usually it is desirable, after smoking wieners, to subject them to a cooking operation, and this operation is most readily and suitably effected by effecting the cooking while the sausage is loaded on the sausage-stringing frame. After the cooking operation, the sausage can be removed, as a whole, from the sausage-stringing frame; or, if desired, the sausage may be cut at the constricted portions, thus separating the links from each other, the cutting being effected as the operation of removing the sausage from the sausage-stringing frame proceeds.

In some cases, where artificial sausage casings are employed, it is desirable to remove the casings after the smoking and cooking operations have been performed. This may be done in accordance with the method described in Freund Patent No. 1,631,723, granted June 7, 1927.

The apparatus described is simple, cheap and durable, and well adapted to its purpose. The improved method greatly simplifies the operation of linking and curing sausages and is economical, as compared with present methods. The improved method also obviates danger of injury to the sausages, and tends to prevent waste. The sausages will retain the linked form after the curing operation.

The foregoing detailed description has been given for clearness of understanding only, and no unnecessary limitations should be understood therefrom, it being the intent to claim the invention as broadly as permissible, in view of the prior art.

What I regard as new, and desire to secure by Letters Patent, is:

1. A portable sausage-stringing device adapted to support sausage in a curing operation and comprising a rigid supporting frame equipped with stationary resilient pinching and gripping devices into which the sausage may be forced, said pinching devices serving to constrict and grip the sausage casing as the sausage is entered in the pinching devices.

2. A portable sausage-stringing device comprising a rigid frame, a plurality of transverse series of stationary pinching and gripping devices mounted on said frame and separated by spaces corresponding with the lengths of the links desired, and end devices for engaging the looped-portions of the sausage as it is strung back and forth upon the sausage-stringing device.

3. A portable sausage-stringing device comprising a rigid supporting frame, a plurality of transverse series of non-travelling pinching and gripping devices mounted on said frame and spaced with relation to each other, and loop-receiving pinching and gripping devices mounted on said frame at the ends of the sausage-stringing device.

4. A portable sausage-stringing device comprising a frame equipped between its ends with a plurality of transverse series of stationary, resilient pinching and gripping devices and equipped at its ends with loop-receiving pinching devices disposed at an angle with respect to the first-mentioned pinching devices.

5. A sausage-stringing device comprising side bars, end bars, and intermediate cross-bars; a series of pinching devices mounted on each intermediate cross-bar and provided with alined openings for receiving the constricted portions of the sausage casing; and a series of spaced pinching devices mounted on each end cross-bar and provided with openings receiving the constricted loop-portions of the sausage casing.

6. A sausage-stringing device comprising a frame, and pinching devices mounted on said frame, said pinching devices comprising resilient overlapping members having complemental recesses to receive the constricted portions of the sausage casing when the sausage is forced between the resilient members and into engagement with said recesses.

7. A sausage-stringing device comprising a supporting frame, and pinching devices mounted on said frame, said pinching devices comprising resilient arches having side members co-acting with each other, said arches affording between them an entrance angle through which the sausage may be entered so as to be gripped by adjacent side members of the arches.

8. A sausage-stringing device comprising a supporting frame and gripping devices mounted thereon, said gripping devices comprising resilient arches having overlapping side members provided with complemental offsets, the curved ends of said arches affording between them an entrance angle through which the sausage may be forced, said arches serving to constrict the sausage casing and force the meat in opposite directions from the constriction during the operation of inserting the sausage between the arches.

9. A sausage-stringing device comprising a supporting frame, a plurality of transverse series of gripping devices, each series comprising resilient arches having their side members adapted to co-act in pinching the sausage as it is entered between the arches, the curved end-portions of the arches affording between them an entrance angle.

10. A sausage-stringing device comprising a supporting frame, a plurality of transverse series of gripping devices, each series comprising resilient arches having their side members adapted to co-act in pinching the sausage as it is entered between the arches, the curved end-portions of the arches affording between them an entrance angle, and loop-receiving gripping devices at the ends of said frame comprising pairs of resilient arches between which the loop-portions of the sausage may be added as the sausage is strung back and forth upon the sausage-stringing device.

11. A sausage-stringing device comprising a plurality of transverse series of arch-like gripping devices having co-acting resilient side members; and pairs of arch-like loop-receiving gripping devices at the ends of the sausage-stringing device, said loop-receiving pinching devices being disposed substantially at right angles to the pinching devices of the intermediate series.

12. In a sausage-stringing device, a supporting bar, and sausage-pinching devices mounted thereon comprising resilient arches having overlapping side members equipped with complemental offset portions affording an opening for the constricted portion of a sausage casing, the crown-portions of said arches affording between them an entrance angle through which the sausage may be forced by lateral movement.

13. The method of preparing linked sausages, which comprises bringing pressure to bear at spaced intervals on opposite sides of a filled sausage casing so as to constrict said sausage casing laterally at the points at which pressure is applied, then subjecting said constricted portions of said sausage casing to pressure in another direction to reduce said constricted portion of the casing to still further compass, and securing said casing in this condition during the remainder of the operations to which the filled sausage casing may be subjected.

14. The method of preparing linked sausages, which comprises bringing lateral pressure to bear upon a filled sausage casing at spaced intervals to effect a lateral constriction thereof, then subjecting the constricted portions of the casing to pressure from the opposite direction to effect vertical constriction thereof, and holding said filled sausage casing in this position during the remainder of the treating operations.

15. The method of preparing linked sausages, which comprises placing a filled sausage casing on a frame, bringing lateral pressure to bear upon said casing at spaced intervals until said sausage casing becomes thin at the point at which pressure is applied, bringing pressure to bear vertically upon the thin portion of said casing to reduce it to still smaller compass, and holding said sausage casing in this position during the remainder of the operations to which it is subjected.

HAROLD E. DIETRICH.